United States Patent Office 3,429,331
Patented Feb. 25, 1969

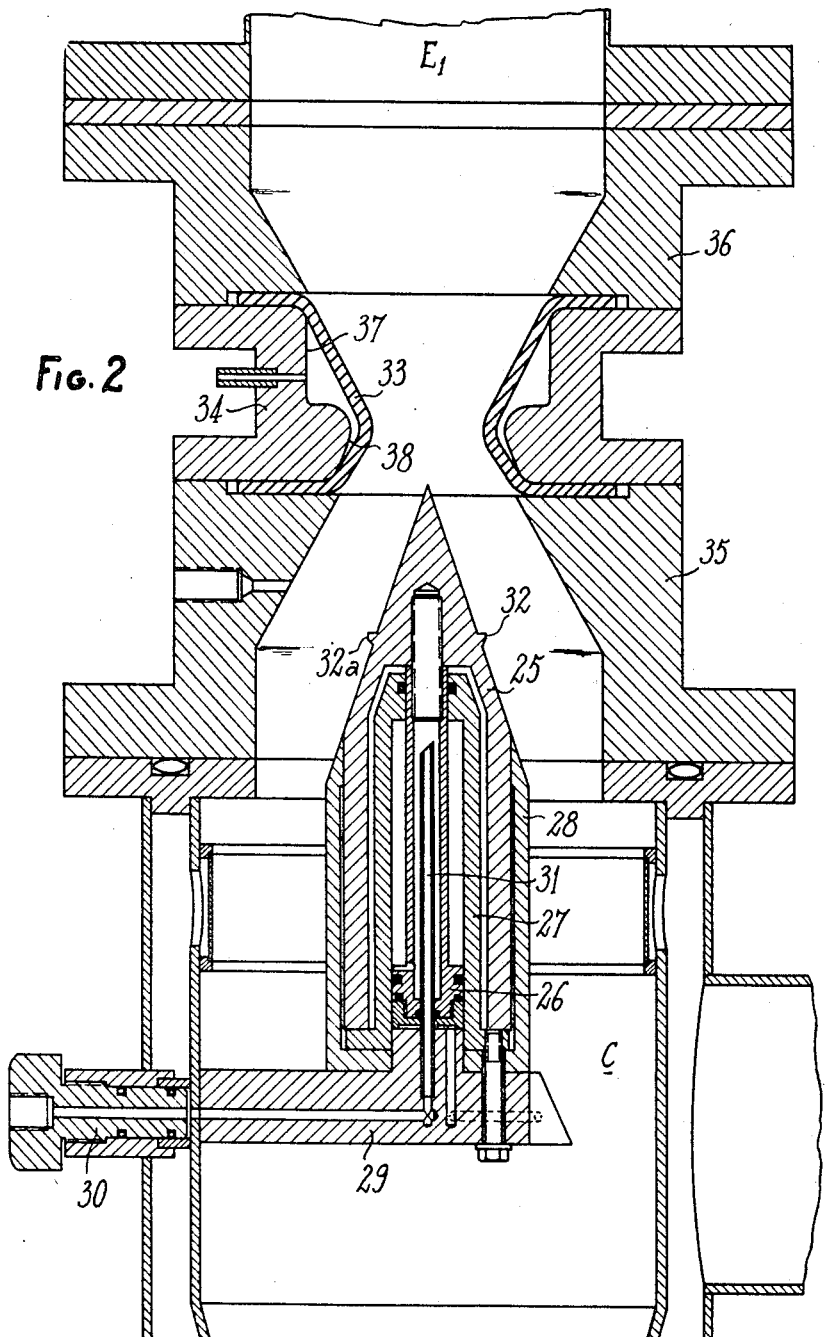

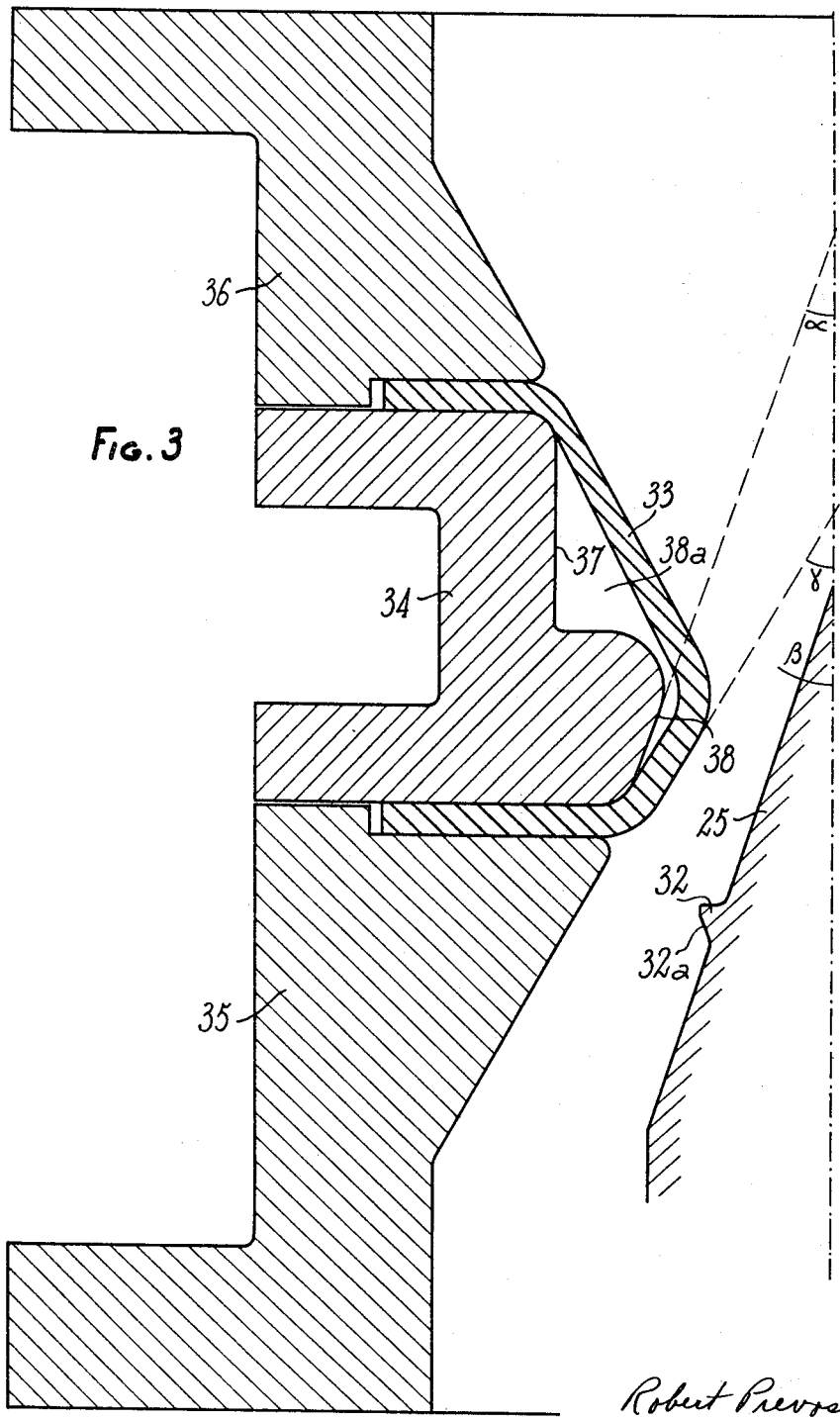

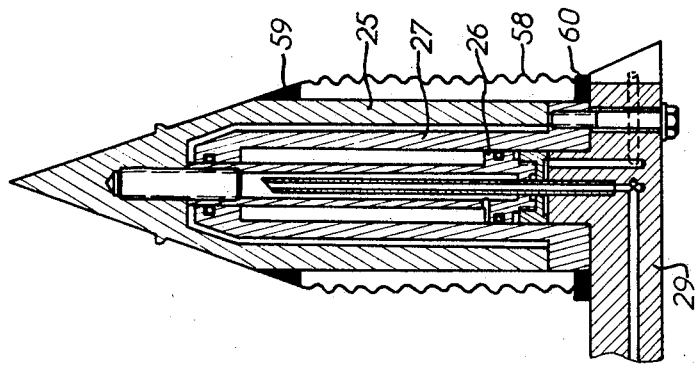
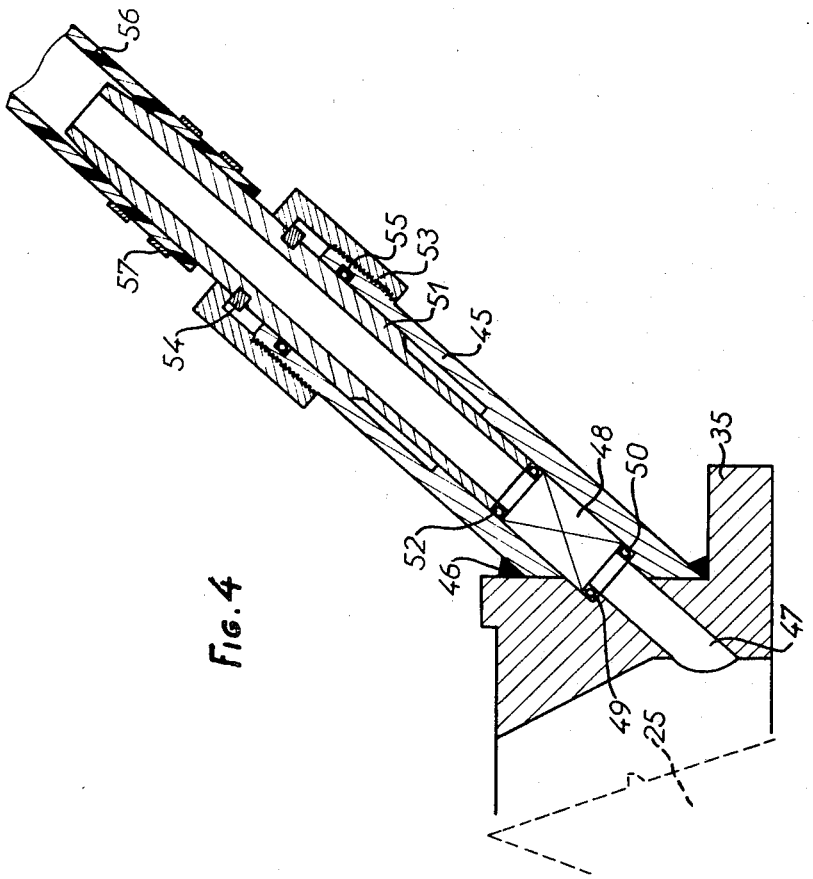

3,429,331
NEEDLE VALVES, NOTABLY FOR DIRECT-FLOW LOCK-CHAMBERS
Robert Prevost, Le Vesinet, France, assignor to Societe Anonyme Heurtey, Paris, France
Filed Mar. 18, 1966, Ser. No. 535,413
Claims priority, application France, Mar. 24, 1965, 10,486; Nov. 22, 1965, 39,268; Feb. 8, 1966, 48,784
U.S. Cl. 137—219
Int. Cl. B65g 51/00; B67d 5/54

11 Claims

ABSTRACT OF THE DISCLOSURE

The invention concerns a screen equipped with two needle valves which are actuated in order to transfer pulverulent material from one atmosphere into another atmosphere. The needle valves have flexible seat members which are biased into tight engagement with the needle valve members. The valves are operated in sequence to convey a pulverulent material from one atmosphere or space into a lock chamber between the valves and then from the lock chamber to a second atmosphere or space. The structure satisfies the three conditions of perfect tightness, high viability and no stacking of the grains in any portion whatsoever of the apparatus which would result in denaturing the product.

This invention relates to valves of the needle type wherein the needle-valve member is adapted to engage a conical seat, these valves being intended more particularly for equipping direct-flow lock-chambers.

It is known that when it is desired to transfer a flowing product or material from an enclosure $E_1$ in which a certain pressure and/or an atmosphere having a certain composition prevail, to another enclosure $E_2$ in which another pressure and/or atmosphere having a composition other than that of said first enclosure prevail, a lock-chamber is used which comprises a fluid-tight chamber connected on the one hand to the outlet duct of the first enclosure $E_1$ and on the other hand to the inlet duct leading to the other enclosure $E_2$. This lock-chamber C comprises two fluid-tight valves, that is, an upstream valve and a downstream valve, permitting by their operation to either isolate the chamber by simultaneously closing said valves, or to cause said enclosure $E_1$ to communicate with the lock-chamber for filling same by opening the upstream valve and closing the downstream valve, or alternately to discharge the lock-chamber into the other enclosure $E_2$ by closing the upstream valve and opening the downstream valve.

For transferring materials in the form of fine elements or particles from the granule size to the state of fine dust particles, it is more convenient to utilize needle-valve devices.

It is already known to use valves comprising a needle-type valve member associated with a seat consisting of a diaphragm made of a material adapted to undergo an elastic deformation such as a plastic diaphragm.

However, it was observed that in this case granules or dust particles are either wedged between, or caused to stick to, the needle valve and its seat, thus preventing the lock-chamber from having the desired tightness.

It is the essential object of the present invention to provide improvements in needle valves of this character, whereby the inconveniences set forth hereinabove are avoided while affording specific advantages notably in connection with their mode of operation.

According to a first feature characterizing this invention, the needle-valve seat forming diaphragm has the shape of two frusto-conical members assembled by their small bases.

According to another feature of this invention the device is rendered completely vacuum-tight even in case of a continuous flow of a material in the finely divided state by providing on the needle valve member an annular projection or ejector having a certain counter-taper, this annular projection or ejector being adapted to scrape off any dust particles or granules adhering to the diaphragm constituting the seat engaged by said needle valve member in its closed position.

Another feature characterizing this invention and assisting in ensuring a satisfactory vacuum tightness consists in that, in the closed valve position, the needle-valve member causes the diaphragm to be wedged against a metal support surrounding said diaphragm, whereby said diaphragm is pressed strongly and regularly against said support.

According to a complementary feature of this invention, the tapered needle-valve and the diaphragm support also of tapered configuration form with the valve axis equal angles whereby said diaphragm is efficiently tightened against its support.

According to an advantageous feature of this invention, when the valve is open, the angle formed between the seat-forming surface of the diaphragm and the valve axis is slightly greater than the angle formed between said support and said axis. As a result, the diaphragm can undergo a certain distortion without impairing the valve-closing action, whereby a considerable fluid-tightness is obtained.

It is a complementary feature of the present invention to prevent the vacuum pump of the lock-chamber from becoming clogged during the transfer of fine dust or like particles by providing on the valve body a vacuum connection consisting of a tube inclined with respect to the valve axis so that the dust particles constantly tend to move downwards in the lock-chamber, a filter being detachably fitted in this tube.

Other features and advantages of the improvements constituting the subject-matter of this invention will appear as the following description proceeds with reference to the accompanying drawing showing typical forms of embodiment given by way of example of devices applied to a lock-chamber of which only the outlet of the enclosure $E_1$ and the upper portion of the chamber proper C are shown, the lock-chamber comprising of course another enclosure $E_2$ connected to said chamber C by other similar means disposed symmetrically with respect to the arrangement illustrated.

In the drawing:

FIGURE 1 is an axial section showing a first form of embodiment;

FIGURE 1*a* is an axial section showing the complete lock-chamber with the two needle valves.

FIGURE 2 is an axial section showing another form of embodiment;

FIGURE 3 is a detail view showing on a larger scale the needle-valve member and the seat-forming diaphragm of FIGURE 2;

FIGURE 4 is an axial section showing a pressure connection, and

FIGURE 5 is an axial section showing a bellows-type sealing device.

In the form of embodiment illustrated in FIGURE 1 the valve unit according to this invention comprises, between the enclosure $E_1$ and chamber C, a fixed portion consisting of a biconical seat member 1 secured on the one end by bolts 2 to a collar 3 fastened in turn to a flange 4, and on the other end by means of bolts 5 to another collar 6 rigid in turn with another flange 7.

Externally to said seat 1 is a casing 8 constituting with said seat 1 a chamber 9 adapted to communicate through a duct 10 with a source of pressure.

Figure 1:
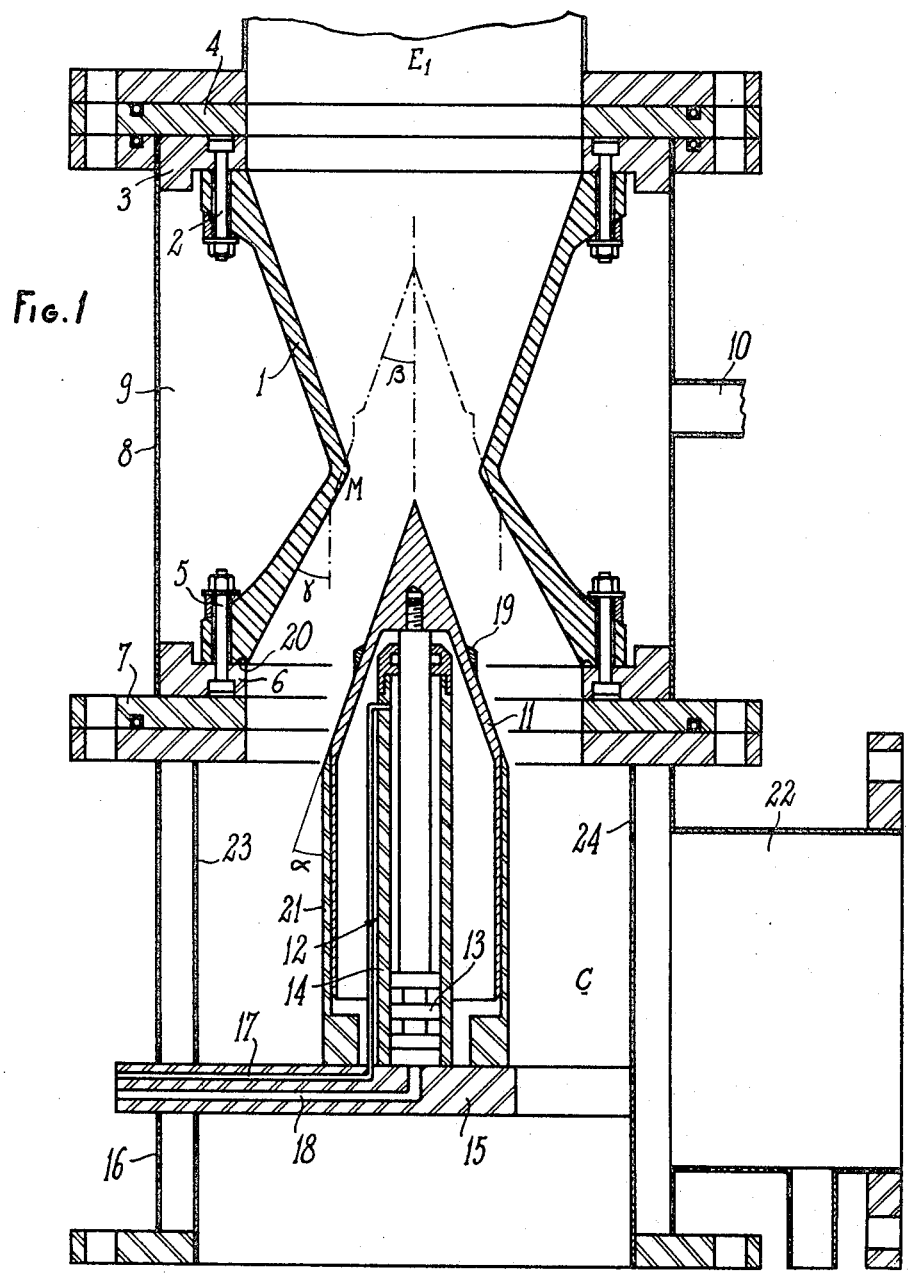
Figure 1A:
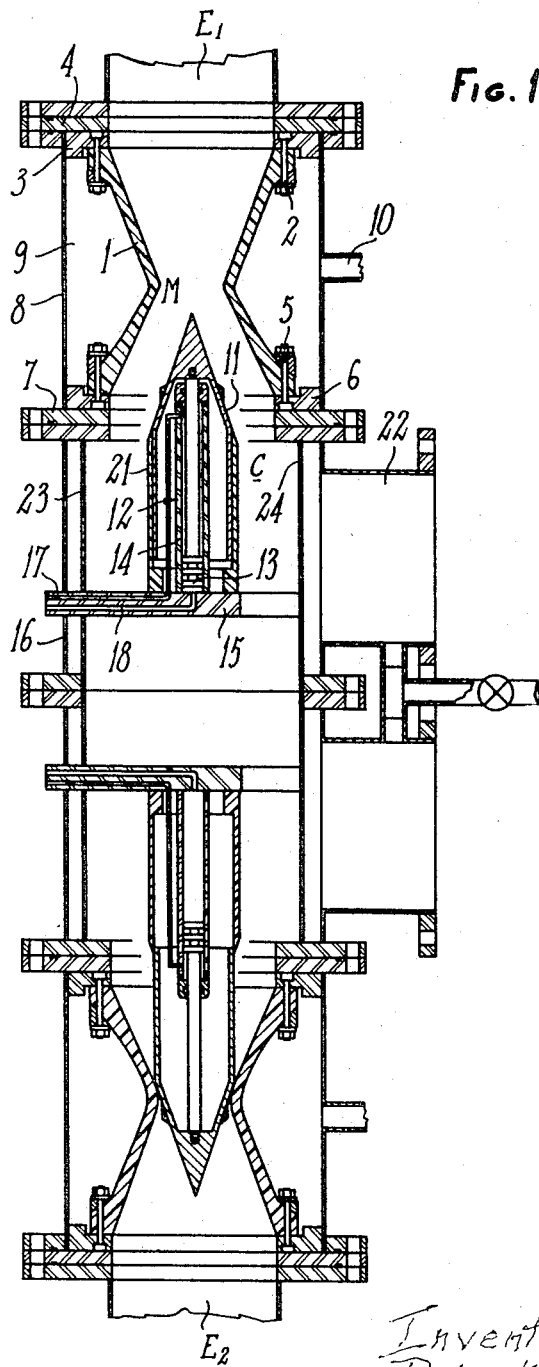

The valve seat 1 consists of plastic material or more generally of a material adapted to undergo an elastic deformation. It may consist of polyethylene of the so-called "food" quality if the products to be transferred consist of food stuff. Its inner face is subjected to the pressure prevailing in enclosure $E_1$ or to the pressure existing in the other enclosure $E_2$ of the lock-chamber. Its outer face is responsive to a variable pressure depending on the pressure of the fluid introduced through duct 10. By varying this pressure $p$ as a function of time $p=f(t)$ which may advantageously be of periodical nature and calculated experimentally, the granules or particles which otherwise would adhere to the inner surface of the seat member are detached therefrom.

In order to ensure a complete fluid-tightness between the base of diaphragm 1 and its fastening means on collar 6, its joint surface has grooves or corrugations 20 formed in its lower face in order to facilitate the compression thereof.

The needle-valve member 11, in this example, is responsive to a double-acting hydraulic or pneumatic actuator 12. The piston 13 of this actuator is rigid with the needle-valve member and the cylinder 14 is rigid in turn with a fixed support 15 consisting for example of a spider mounted on the body 16 of the chamber. This actuator 12 is fed through ducts 17–18 formed in the aforesaid support 15. This assembly is completely fluid-tight so that the driving fluid flowing through ducts 17–18 for controlling the actuator cannot pollute the product to be transferred from enclosure $E_1$ to chamber C.

The needle-valve member 11 has formed thereon a projection 19 acting as a scraper and adapted to lift the granules possibly left between the needle-valve and the seat during the closing movement. This projection consists preferably of a detachable ring.

To prevent the granules or dust particles from penetrating into the needle-valve member, the base of this member and the actuator 12 are enclosed in a self-lubricating plastic sleeve 21, for example of superpolyamid or tetrafluoroethylene. This sleeve has its upper edge bevelled to an angle to reduce the tendency of the dust particles or other granules to adhere thereto.

A presure intake 22 is mounted on the body 16 supporting the needle-valve member, so that the pressure prevailing either in enclosure $E_1$ or in enclosure $E_2$ may be established in the lock-chamber.

Moreover, the body 16 is jacketed by a protection sleeve 23 having perforations 24 formed in its upper portion to prevent granules or dust particles of relatively large size from penetrating into the pressure intake 22.

In order to provide the desired fluid-tightness by distortion of the flexible diaphragm 1, the angle $\beta$ of the needle-valve differs from the angle $\gamma$ formed at M between the inner surface of the diaphragm and the axis of the lock chamber. The values of these angles are determined experimentally so that as a consequence of the aforesaid elastic distortion the contact surface between the needle-valve member and the seat-forming diaphragm be sufficient to warrant a complete fluid-tightness and that on the other hand the dust particles can easily slide on the needle-valve surface during its opening movement.

As shown, the needle valve member closes the communication between chamber C and enclosure $E_1$ by moving upwards. The device also comprises, as a complementary element of the lock-chamber, a seat or diaphragm and a needle-valve arranged and mounted like those described hereinabove, the diaphragm support being secured benath the needle-valve support, said needle-valve closing the communication between the other enclosure $E_2$ not shown and the lock-chamber C by moving downwards.

A lock-chamber constructed as per the above description may advantageously be utilized for transferring products consisting of fine elements or granules or particles at very low temperatures, of the order of $-40°$ C., or relatively high temperatures, for example $100°$ C.

In the form of embodiment illustrated in FIGURES 2 and 3 the valve member or needle-valve 25 is rigid with a piston 25 slidably fitted in a cylinder 27. The needle valve 25 is guided during its movements by a sleeve 28 which, like cylinder 27, is rigid with a fixed support 29. The needle-valve movements are controlled by means of a pressure fluid fed through a union 30 and a tube 31 disposed coaxially to said piston.

The needle-valve 25 comprises an annular projection 32 constituting the granule ejection. This projection is formed with a counter-taper 32a.

The valve seat consists of a diaphragm 33 of substantially biconical configuration, as shown. This diaphragm is made of suitable conducting plastic material so that the electrostatic charges developing as a consequence of frictional contacts may be eliminated. It is retained in position by a support 34 secured to the valve body 35 and to the flange 36. This support 34 comprises a cylindrical portion 37 and a conical portion 38.

The angle $\alpha$ of the conical portion 38 of this support is equal to the angle $\beta$ of needle-valve 25. The angle $\gamma$ of diaphragm 33 is greater than said angles $\alpha$ and $\beta$.

The diaphragm 33 forms with its support 34 a chamber 38a permitting the distortion of the diaphragm during the valve closing movement.

With the arrangement described hereinabove the following results are obtained:

During the valve closing movement the needle valve 25 presses and wedges the diaphragm 33 against its support, the valve closing without difficulty since the diaphragm can freely undergo a resilient deformation.

A complete fluid-tightness of the valve is obtained as a consequence of the equality of the angles of said diaphragm support and said needle-valve, the diaphragm being uniformly applied against the entire tapered surface 38 of said support.

On the other hand, due to the specific shape of ejector 32, the granules and dust particles still adhering to the diaphragm are easily removed. As the ejector diameter is slightly greater than the minimum diameter of the diaphragm, the ejector will scrape the granules or powder or dust particles, thus permitting their evacuation.

As the diaphragm surface is cleaned before each closing movement, the fluid-tightness betwen the needle-valve and the diaphragm is constantly ensured.

In the form of embodiment illustrated in FIGURE 4 the vacuum connection comprises a tube 45 welded in a fluid-tight manner at 46 to the body 35 in which a duct 47 in axial alignment with this tube is formed. The axis of tube 34 is inclined to the valve axis to enable the dust particles to fall back into the lock-chamber, as already explained hereinabove.

This tube 45 comprises an internal filter cartridge 48 clamped on the lower shoulder 49 of this tube 45 by means of a washer 50. This clamping action is obtained by means of an internal tube 51 coaxial to tube 45 and bearing on the upper end of said filter cartridge 48 by means of another washer 52. The tube 51 is subjected to the clamping action by means of a nut 53 engaging the tube 45 and driving the tube 51 by means of a split washer or circlip 54.

The vacuum tightness is obtained by using an O-ring or like member 55 interposed between the two tubes 45 and 51.

The connection with the primary pump is obtained by means of a flexible hose 56 clamped on the tube 51 by means of clamping collars 57.

The filter 48 may be of any suitable type, provided that it prevents the passage of dust particles. It may consist for example of perforated or woven metal washers adapted to clamp fabric discs, pads, felt discs or the like having a suitable pattern or structure.

It will be noted that the valve for introducing air or the desired atmosphere into the lock-chamber during each cycle of operation is mounted between the above-described intake and the vacuum pump. Thus, at each cycle the air or other atmosphere introduced into the lock-chamber is delivered through the tube 51 and tends to drive back into this chamber the dust particles accumulating in the filter 48.

It may also be noted that the filter 48 may be cleaned periodically by closing the two valve members of the lock-chamber and delivering a jet of compressed air or other controlled and compressed atmosphere through the tube 51.

FIGURE 5 illustrates the device according to this invention for preventing the clogging of the internal component elements of needle-valve 25. This needle-valve may be constructed as shown in FIGURE 2 and be rigid with a piston 26 slidably mounted in a cylinder 27. As contrasted with the arrangement shown in FIGURE 2, the external sleeve of the needle-valve is dispensed with and, according to this invention, a metal bellows 58 is disposed externally of the needle-valve, this bellows 58 having one end welded at 59 to the needle-valve and the other end welded at 60 to the fixed support 29 of the needle-valve actuating mechanism.

The lock-chambers constructed by utilizing the valves according to this invention may be used for transferring not only finely-divided or granular products or materials, but also liquids from one atmosphere to another, different atmosphere, or from a lower pressure medium to a higher pressure medium. They are also suitable for use when it is desired to transfer a liquid from an upper pressure to a lower pressure if this change is permitted by the physical properties of the liquid.

Of course, this invention should not be construed as being limited by the specific forms of embodiment described hereinabove and illustrated in the attached drawing, since many modifications and variations may be brought thereto without departing from the spirit and scope of the invention as set forth in the appended claims. Besides, the valves of this invention may be used as such, independently of their specific application to lock-chambers.

What I claim is:

1. A system for transferring flowing material from one upstream enclosure to another downstream enclosure comprising a direct-flow lock-chamber controlled by a pair of symmetrically mounted valves, each of said valves being of the needle-valve type comprising a seat-forming diaphragm of plastic resilient material capable of undergoing a certain elastic deformation, said diaphragm having the shape of a pair of frusto-conical members assembled by their small bases, a cylindrical casing coaxial to said diaphragm in which said diaphragm is mounted, the space left between said casing and the outer surface of said diaphragm being adapted to receive a variable pressure for altering the shape of said diaphragm, the needle-valve member proper of said valves comprising an annular projection adapted to remove any particles of said flowing material adhering to and between said needle-valve member and its seat during the valve closing movement, said annular projection having a counter-taper, and a metal support surrounding and backing said diaphragm whereby, during the valve-closing movement, said needle-valve member proper is adapted to wedge said diaphragm against said metal support by strongly and uniformly pressing same thereagainst.

2. A needle valve as set forth in claim 1 wherein a double-acting fluid-actuated cylinder is sealed by an external plastic sleeve made of self-lubricating material.

3. A needle-valve as set forth in claim 2, wherein said plastic sleeve has a bevelled free edge adapted to prevent the particles of flowing material from adhering thereto.

4. Needle-valve as set forth in claim 2, wherein said diaphragm support comprises a tapered section in its diaphragm-engaging portion, the vertex angle of said tapered section being equal to that of said needle-valve member.

5. Needle-valve as set forth in claim 2, wherein said diaphragm support comprises a tapered section in its diaphragm-engaging portion, the vertex angle of said tapered section being equal to that of said needle-valve member, said diaphragm support also comprising a cylindrical portion adjacent to and following said tapered portion, adapted to form with said diaphragm a free space whereby the shape of said diaphragm can be altered freely during the application of said needle-valve pressure.

6. A needle valve as set forth in claim 5 wherein the vertex angle of said tapered section of said diaphragm adapted to receive the needle-valve pressure is slightly greater than the vertex angle of the tapered portion of said diaphragm support.

7. Needle valve as set forth in claim 1, wherein said double-acting fluid-actuated cylinder is surrounded by a bellows secured notably by welding on the one hand to said needle-valve support and to its cylinder, and on the other hand to said needle valve member proper.

8. A needle valve as set forth in claim 2, wherein a pressure connection is mounted in the needle-valve body to permit the establishment in the lock-chamber of the pressure prevailing either in said upstream enclosure or in said downstream enclosure.

9. A needle-valve as set forth in claim 2 wherein said valve body having fitted thereon a vacuum connection consisting of a tube inclined to the valve axis so that fine dust particles of said flowing material will constantly tend to travel downwards through said lock-chamber, and a filter detachably mounted in said tube.

10. Needle-valve as set forth in claim 9, wherein said filter is clamped against an inner shoulder of said tube by another, inner tube coaxial to the former and connected to the vacuum pump, said inner tube being pressed against said filter by a nut-forming member engaging said external tube and bearing against said inner tube by means of a ring member.

11. A needle valve as set forth in claim 1 wherein the valve controlling the atmosphere to be delivered into the lock-chamber during each cycle of operation is mounted between said vacuum connection and said vacuum pump.

References Cited

UNITED STATES PATENTS

| | | | |
|---|---|---|---|
| 208,986 | 10/1878 | Patterson | 137—614.18 X |
| 1,395,018 | 10/1921 | Soderstrom | 251—361 X |
| 1,836,374 | 12/1931 | Kelly | 137—242 X |
| 2,341,018 | 2/1944 | Clapp | 137—244 |
| 2,470,744 | 5/1949 | Korn | 137—242 |
| 2,598,122 | 5/1952 | Hansen | 137—525 |
| 2,608,204 | 8/1952 | Dunn | 137—525 X |
| 2,687,868 | 8/1954 | Barrett et al. | 137—221 X |
| 2,852,035 | 9/1958 | Holle | 137—219 |

WILLIAM F. O'DEA, *Primary Examiner.*

DENNIS H. LAMBERT, *Assistant Examiner.*

U.S. Cl. X.R.

137—244, 525, 614.18; 251—333; 302—62